United States Patent
Omidyar

(10) Patent No.: US 8,051,007 B2
(45) Date of Patent: *Nov. 1, 2011

(54) METHOD AND SYSTEM TO FACILITATE A PAYMENT IN SATISFACTION OF ACCUMULATED MICROPAYMENT COMMITMENTS TO A VENDOR

(75) Inventor: Pierre M. Omidyar, Henderson, NV (US)

(73) Assignee: eBay Inc, San Jose, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/544,919

(22) Filed: Aug. 20, 2009

(65) Prior Publication Data

US 2009/0319409 A1 Dec. 24, 2009

Related U.S. Application Data

(63) Continuation of application No. 10/741,091, filed on Dec. 19, 2003, now Pat. No. 7,702,584.

(51) Int. Cl.
G06Q 40/00 (2006.01)
(52) U.S. Cl. .......................................... 705/40; 705/39
(58) Field of Classification Search ................ 705/35, 705/39–40
See application file for complete search history.

(56) References Cited

U.S. PATENT DOCUMENTS

| | | | |
|---|---|---|---|
| 5,732,400 A | 3/1998 | Mandler et al. | |
| 5,778,178 A | 7/1998 | Arunachalum | |
| 5,987,500 A | 11/1999 | Arunachalam | |
| 5,999,919 A * | 12/1999 | Jarecki et al. | 705/40 |
| 6,138,107 A | 10/2000 | Elgamal | |
| 6,212,556 B1 | 4/2001 | Arunachalam | |
| 6,450,407 B1 | 9/2002 | Freeman et al. | |
| 6,473,740 B2 | 10/2002 | Cockrill et al. | |
| 7,702,584 B2 * | 4/2010 | Omidyar | 705/40 |
| 2002/0059114 A1 | 5/2002 | Cockrill et al. | |
| 2002/0132662 A1 | 9/2002 | Sharp et al. | |
| 2004/0215561 A1 * | 10/2004 | Rossides | 705/40 |
| 2005/0102242 A1 | 5/2005 | Omidyar | |

FOREIGN PATENT DOCUMENTS

| | | |
|---|---|---|
| JP | 01027196 A2 | 1/1989 |
| JP | 02029970 A2 | 1/1990 |
| JP | 11195074 A2 | 7/1999 |
| JP | 2002007933 | 1/2002 |

(Continued)

OTHER PUBLICATIONS

"European Application Serial No. 03781882.0, Office Action Mailed Feb. 1, 2010", 5 pgs.

(Continued)

Primary Examiner — Thu Thao Havan
(74) Attorney, Agent, or Firm — Schwegman, Lundberg & Woessner, P.A.

(57) ABSTRACT

A method and a system facilitate payments between a plurality of parties. A plurality of payment commitment made to a second party is accessed, the plurality of payment commitments contributing towards a total commitment receivable value for a second party and made by a plurality of payor parties to the second party. The total commitment receivable value for the second party is calculated utilizing a risk indication, where the risk indication is based on reputation information of a party. A payment process, for payment of the total commitment receivable value by a first party to the second party, is initiated.

20 Claims, 10 Drawing Sheets

FOREIGN PATENT DOCUMENTS

| | | |
|---|---|---|
| JP | 2002117361 | 4/2002 |
| JP | 2002251519 | 6/2002 |
| JP | 2002518749 T2 | 6/2002 |
| JP | 2002197278 | 7/2002 |
| JP | 2002259844 A2 | 9/2009 |
| KR | 20020004779 | 1/2002 |
| KR | 20020080833 | 10/2002 |
| WO | WO-0219211 A1 | 3/2002 |
| WO | WO-0297750 A1 | 12/2002 |
| WO | WO-2005048152 A1 | 5/2005 |

OTHER PUBLICATIONS

"Indian Application Serial No. 2207/DELNP/2006 Office Action mailed Nov. 30, 2009", 2 pgs.
"Japanese Application Serial No. 2005-510655, Final Office Action mailed Mar. 30, 2010", 2 Pgs.
"Canadian Application Serial No. 2,543,730, Office Action mailed Jul. 8, 2010", 7 Pgs.
"Chinese Application Serial No. 200380110667.7, Office Action mailed Jun. 12, 2010", 4 pgs.
"European Application Serial No. 03781882.0, Office Action Response Filed Aug. 3, 2010", 16 pgs.
"European Application Serial No. 06844306.8 Office Action Response Filed Jul. 27, 2010", 9 pgs.
"Canadian Application Serial No. 2,543,730, Response filed Dec. 21, 2010 to Non Final Office Action mailed Jul. 8, 2010", 8.
"Chinese Application Serial No. 200380110667.7, Office Action Response Filed Oct. 27, 2010", 13, Jun. 9, 2010.
"European Application Serial No. 03781882.0, Written Submission Filed Jan. 10, 2011 to Summons to Attend Oral Proceedings mailed Oct. 22, 2010", 35, Feb. 1, 2010.
"European Application Serial No. 03781882.0, Summons to Attend Oral Proceedings mailed Oct. 22, 2010", 7 Pgs.
"U.S. Appl. No. 10/741,091, Non-Final Office Action mailed Feb. 5, 2009", 11 pgs.
"U.S. Appl. No. 10/741,091, Non-Final Office Action mailed Jun. 25, 2008", 28 pgs.
"U.S. Appl. No. 10/741,091, Notice of Allowance mailed Jul. 1, 2009", 6 pgs.
"U.S. Appl. No. 10/741,091, Notice of Allowance mailed Dec. 3, 2009", 7 pgs.
"U.S. Appl. No. 10/741,091, Preliminary Amendment filed Jan. 14, 2008", 13 pgs.
"U.S. Appl. No. 10/741,091, Response filed May 5, 2009 to Non Final Office Action mailed Feb. 5, 2009", 15 pgs.
"U.S. Appl. No. 10/741,091, Response filed Oct. 27, 2008 to Non-Final Office Action mailed Jun. 25, 2008", 16 pgs.
"Australian Application No. 2003287634, Office Action Mailed Dec. 18, 2008", 2 pgs.
"International Application Serial No. 03781882.0-1238, Supplementary European Search Report mailed Apr. 2, 2007", 3 pgs.
"International Application Serial No. 2003287634, Examiner's First Report mailed Nov. 22, 2007", 3 pgs.
"International Application Serial No. PCT/US03/35950, International Search Report mailed Apr. 29, 2004", 6 pgs.
"Japanese Application Serial No. 2005-510655, Office Action mailed Apr. 28, 2009", 9 pgs.
"Japanese Application No. 2005-510655, Response filed Jul. 27, 2009 to Office Action Mailed Apr. 28, 2009", 19 pgs.
"Japanese Application Serial No. 2005-510655, Office Action Mailed Sep. 15, 2009", 4 pgs.
"Korean Application No. 2007-7011292 Office Action issued Aug. 14, 2007", 5 pgs.
"Peppercoin", *Financial Technology Sector Transaction News*, (Feb. 10, 2003), 3 pages.
Anderson, Ross, "NetCard—A Practical Electronic Cash System", (1996).
Bergstein, Brain, "Firms Hope Tiny Web Payments Go Big-Time", *Associated Press*, California latimes.com/archives, (Jan. 2, 2004).
Blaze, Matt, et al., "Offline Micropayments without Trusted Hardware", *Financial Cryptography*, 2001, (Jan. 6, 2001).
Brands, Stefan, "Off-Line Electronic Cash Based on Secret-Key Certificates", Stichting Mathematisch Centrum CWI, Report CS-R9506 ISSN 0169-118X, (1995).
Brands, Stefan, "Untraceable Off-line Cash in Wallets with Observers", (Extended abstract), (1993).
Bray, Hiawatha, "Solving the problem of micropayments", The Boston Globe Boston.com, (Feb. 17, 2003).
Buttyan, L, "Removing the financial incentive to cheat in micropayment schemes", *Electronics Letters* vol. 36 No. 2, (Jan. 20, 2000).
Chi, Ellis, "Evaluation of Micropayment Schemes", (Jan. 13, 1997), 1-29.
Chomicki, Jan, et al., "Decentralized Micropayment Consolidation", (1998).
Chomicki, Jan, et al., "Distributed Aggregation of Micropayments", (Jul. 31, 1998).
Cox, Benjamin, et al., "NetBill Security and Transaction Protocol", *Carnegie Mellon University*, Pittsburgh, PA, (1995).
Dai, Xiaoling, "Architecture of a Micro-payment System for Thin-client Web Applications", (2002).
Dai, Xiaoling, et al., "Comparison and contrasting micro-payment models for E-commerce systems", (Aug. 6, 2002).
Eisenberg, Anne, "A Virtual Cash Register Rings Up Tiny Transactions", The New York Times www.nytimes.com, (Jan. 7, 2004).
Ginx, "Nickel Exchange Policies", Ginx! file://J:/EBAY/P152/Prior%20Art/Ginx%20Nickel%20Exchange%20Policies.htm, (Mar. 23, 2004), 6 pages.
Ginx!, "About Nickel Exchange", *Ginx! Discussion Forums*, (Aug. 28, 2003).
Glasner, Joanna, "Finding Gold in the Smallest Sale", *Wired News*, http://www.wired.com/news/business/0,1367,60024,00.html, (Aug. 15, 2003), 4 pages.
Hauser, Ralf, et al., "Micro-Payments based on iKP", *Information Technology Solutions Department, IBM Research Division, Zurich Research Laboratory*, (Jan. 16, 1996).
Hettinga, R A, "Peppercoin gets some press", *cryptography website*, (Feb. 20, 2003), 3 pages.
Kelaskar, Mandar, "Accountability in P2P Democracy", *World of Practical Peers*, Powerpoint presentation printout, 1-15.
Kuro5hin, "Nickel Exchange: P2P Micropaymets", kuro5hin.org higinx, (Nov. 12, 2002), 15 pages.
Kytojoki, Jari, et al., "Micropayments—Requirements and Solutions", *Department of Computer Science, Helsinki University of Technology*, (Jan. 10, 2000), 38 pages.
Masciarotte, Oliver, "Can You Spare a % of a Dime", *MPrimedia Business Magazines & Media, copyright 2004.*, (May 1, 2003).
MIT Technology Insider, "Spinoff Spotlight: Micromanaging Money on the Web", MIT technology insider, www.technologyinsider.com, (Jun. 2003), 1-7.
Mu, Yi, et al., "New Micropayment Schemes based on PayWords", (1997).
Neuman, B Clifford, et al., "Requirements for Network Payment: The NetCheque Perspective", *Proceedings of IEEE Compcon '95, San Francisco*, Information Sciences Institute, University of Southern California, (Mar. 1995).
Pedersen, Torben, "Electronic Payments of Small Amounts", *Cryptomathic, Denmark*.
Peirce, Michael, "Multi-Party Electronic Payments for Mobile Communications", A thesis submitted for the degree of Doctor of Philosophy in Computer Science, University of Dublin, Trinity College, Department of Computer Science, (Oct. 31, 2000), 1-29.
Poutanen, Tomi, et al., "NetCents: A Lightweight Protocol for Secure Micropayments", *Proceedings of the 3rd USENIX Workshop on Electronics Commerce*, (Aug./Sep. 1998).
Resende, Patricia, "Co-founder of RSA Security launches micropayment services company, lands $1.7M in funding", Mass High Tech The Journal of New England Technology, (Feb. 10, 2003), 2 pages.
Rivest, Ronald L., et al., "PayWord and MicroMint: Two simple micropayment schemes", (May 7, 1996), 1-18.
Tang, Lei, "A Set of Protocols for Micropayments in Distributed Systems", *Graduate School of Industrial Administration, Carnegie Mellon University*, (extended abstract), (1995).
Tang, Lei, "Chrg-http: A tool for Micropayments on the World Wide Web", (1996).

Tedeschi, Bob, "Developming Systems of Online Payment", The New York Times www.nytimes.com, (Jul. 21, 2003), 3 pages.

Tewari, Hitesh, et al., "Multiparty Micropayments for Ad Hoc Networks", *NTRG, Dept of Computer Science, Trinity College*, Dublin-2, Ireland, (1996).

Yang, Beverly, et al., "PPay: Micropayments for Peer-to-Peer Systems", 1-15, A1-A6, (2003).

Yen, Sung-Ming, et al., "Improved Micro-payment System", *TamKang University, Department of Electrical Engineering, Laboratory of Cryptography and Information Security*, (Apr. 27, 1998).

\* cited by examiner

METHOD AND SYSTEM TO FACILITATE A PAYMENT IN SATISFACTION OF ACCUMULATED MICROPAYMENT COMMITMENTS TO A VENDOR

RELATED APPLICATIONS

The present application is a continuation of U.S. application Ser. No. 10/741,091, filed on Dec. 19, 2003 now U.S. Pat. No. 7,702,584 which claims the priority benefit of PCT Application No. PCT/US03/35950 filed Nov. 10, 2003, which are incorporated herein by reference in their entirety.

FIELD OF THE INVENTION

The present invention relates generally to the field of commerce automation and, more specifically, to a system to enable a payment in satisfaction of accumulated micropayment commitments to a vendor.

BACKGROUND OF THE INVENTION

Electronic payments between transacting parties have become increasingly prevalent, as the accessibility of technology to enable such payments has increased. For example, a majority of vendors are today equipped to handle credit card and/or debit card transactions. Network-based (or online) vendors are typically heavily dependent on electronic payment services, and may accept a number of electronic payment instruments (e.g., credit cards, debit cards, and other electronic payment services (e.g., the PayPal online payment service)).

A number of companies offer electronic payment (or funds transfer) services (e.g., Visa, Mastercard, American Express, PayPal, etc.). Such electronic payment services naturally charge for the provision of such services, typically on a per-transaction basis. These transaction charges are further typically levied against a vendor that is providing goods or services. While such transaction charges are unattractive to vendors, in many instances the transaction charges are small in comparison to the total transaction value. Further, vendors regard the convenience benefits to both the purchaser and the vendor as outweighing the relevant cost.

The transaction charges levied by the various electronic payment services are, as noted above, typically per-transaction charges, and further often include fixed transaction charges. As a total transaction value decreases, the per-transaction charge of course increases as a percentage of the total transaction value, and the attractiveness to the vendor of using such electronic payment services decreases. It is for this reason that vendors are often reluctant to accept electronic payment (e.g., via a credit card) where the total transaction value is small. The use of electronic payment services becomes particularly unattractive when the transaction costs begin to approach the profit margins associated with a transaction. Consider for example the situation where an online vendor is selling electronic content (e.g., MP3 files) for less than $1. Assuming, for example, a per transaction charge of $0.10, it will be appreciated that the vendor may be reluctant to receive payment via an electronic payment service because 10% of the total transaction value is consumed by electronic payment service charges. The problem becomes more acute as the per item value decreases.

With a view to addressing the problem of transaction charges associated with so-called "micropayments", a number of solutions have been proposed. One such solution is proposed by Jan Chomicki et al, in "Decentralized Micropayment Consolidation", Proceedings of the International Conference on Distributed Computing Systems (ICDS '98), May 1998, Amsterdam, The Netherlands. Specifically, a protocol based on the concept of debt consolidation in a decentralized network environment is discussed in this document.

SUMMARY OF THE INVENTION

According to one aspect of the present invention, there is provided a method to facilitate micropayments between a plurality of parties. A first plurality of micropayment commitments made by a first party is registered, the first plurality of payment commitments contributing towards a total commitment payable value for the first party. A second plurality of payment commitment made to a second party is registered, the second plurality of payment commitments contributing towards a total commitment receivable value for the second party. The total commitment receivable value for the second party is calculated utilizing a risk indication. The total commitment receivable value for the second party is identified as being satisfiable by the total commitment payable value for the first party. Responsive to this determination, a payment process, for payment of the total commitment receivable value by the first party to the second party is initiated.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
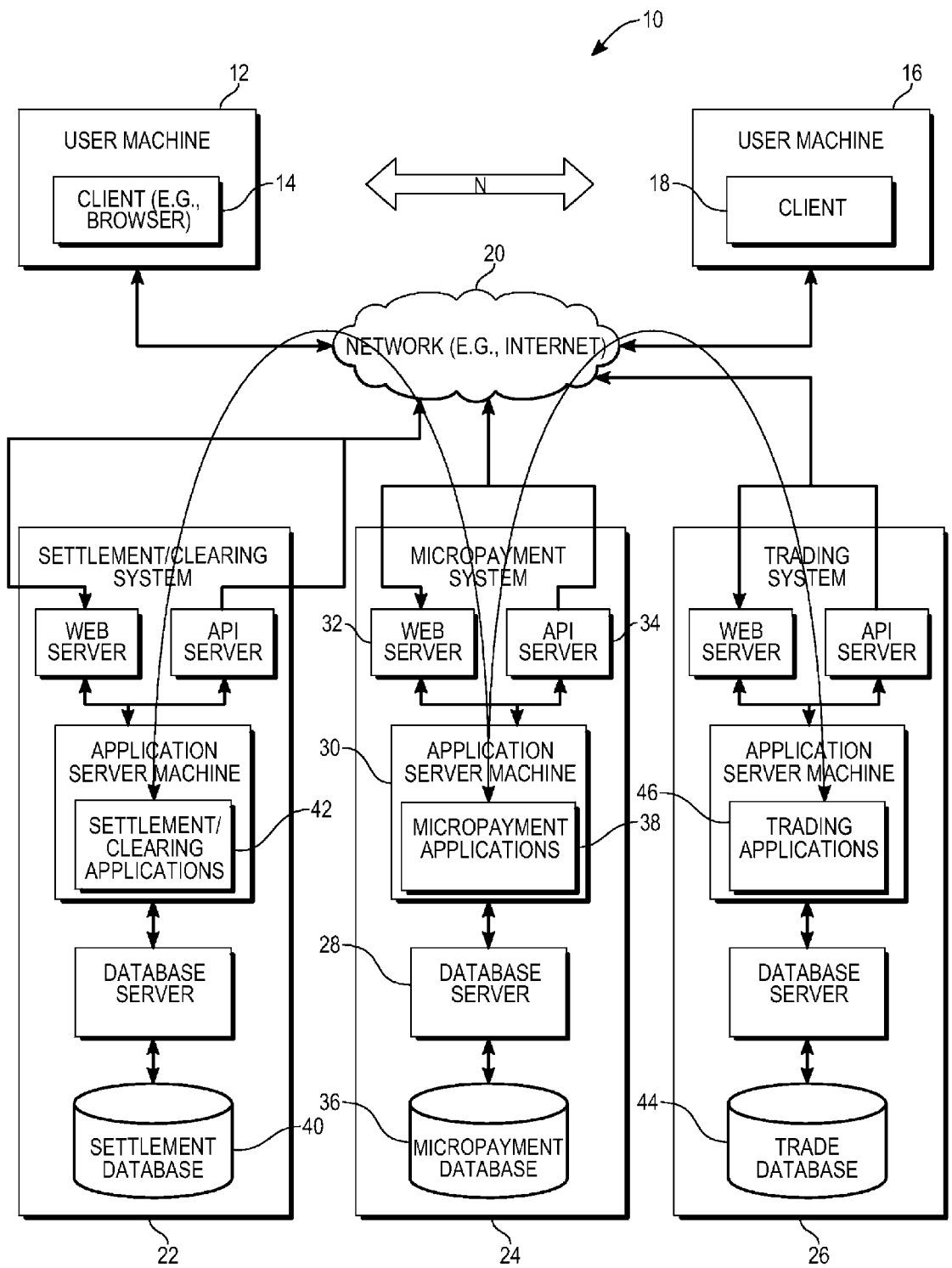
FIG. 1 is a diagrammatic representation of a networked transaction environment, according to an exemplary embodiment of the present invention, within which a client-server architecture is deployed.

A method and system to enable the transfer of micropayments to a vendor are described. In the following description, for purposes of explanation, numerous specific details are set forth in order to provide a thorough understanding of the present invention. It will be evident, however, to one skilled in the art that the present invention may be practiced without these specific details.

While the term "micropayments" is utilized throughout this specification, the present invention is not limited to the processing of payments below a specific value. The present invention may find application in the processing of payments of any value, and the processing of micropayments is described as one use scenario in which the invention would find application.

The below-described exemplary embodiment of the present invention proposes a payment system whereby a payor user is enabled to make payment commitments to a payee user, these payment commitments potentially being for small amounts (e.g., $0.05). The payment commitments made by the payor user are then registered against both the payor user and the payee user. Over time, it will be appreciated that the total value of a number of payment commitments made by the payor user, for example to a number of payee users, will grow. Similarly, the total of the payment commitments made to the payee user, potentially by a number of payor users, will also grow. In order to reduce the transaction costs associated with the processing of these various payment commitments, one exemplary embodiment of the present invention proposes a threshold value at which a payor user may be requested to fund (e.g., make a payment) in connection with a total value that comprises an accumulated total of payment commitments made by that payor user. Similarly, a payee user may, when the accumulated total value of payment commitments made to that payee user exceeds a threshold, become eligible to receive a payment in satisfaction of the accumulated payment commitments. One aspect of an exemplary embodiment of the present invention relates to the determination of which payor user should make a payment to which payee user, and a further aspect of the exemplary embodiment of the present invention relates to the determination of when such a payment should be made, and what the value of such a payment should be. It will be appreciated that, by accumulating payment commitments owed by a payor user, and owed to a payee user, and performing a single payment transaction (or a reduced number of payment transactions) in satisfaction of a number of accumulated payment commitments, the transaction costs associated with the satisfaction of multiple payment commitment may be reduced.

The exemplary embodiment of the present invention further draws a distinction between unfunded payment commitments (e.g., payment commitments for which the payor user has not made a payment in satisfaction thereof), and funded commitments (e.g., payment commitments in connection with which the payor user has made a payment).

FIG. 1 is a diagrammatic representation of a networked transaction environment 10, according to an exemplary embodiment of the present invention, within which a client-server architecture is deployed. A number of client-side machines are shown to be coupled, via a network 20, to a number of server-side machines and processes. For example, a client machine 12 is shown to host and execute a first client application, in the exemplary form of a web browser 14, and a second client machine 16 is shown to execute a further client 18, which may communicate via one or more server-side machines utilizing a published Application Program Interface (API). Each of the client machines 12 and 16 is shown to be coupled to the network 20 (e.g., the Internet, Local Area Network (LAN), a Wide Area Network (WAN)), which may include wired, wireless or some combination of wired and wireless technologies. The network 20 may furthermore facilitate communications between the client machines and the server-side utilizing any one of a number of well-known protocols (e.g., HTTP).

Returning now to the server-side, three systems are also coupled to the network 20, namely a settlement system 22, a micropayment system 24, and a trading system 26. While each of the systems 22, 24 and 26 is shown in FIG. 1 to be a separate and distinct system, in alternative embodiments of the present invention, the components and functions of these systems may be integrated into one or more related systems. Each of the exemplary systems 22, 24 and 26 is shown to have a similar three-tier architecture, including a database server 28, which facilitates access to an associated database, one or more application server machines 30, which host and execute respective applications, one or more web servers 32 that generate and/or serve web pages (e.g., HTML pages) responsive to requests received from the client-side, and one or more Application Program Interface (API) servers 34 that provide programmatic access to an associated system. For example, an API server 34 may, responsive to a request received from the client-side, generate and serve eXtensible Markup Language (XML) files to a requesting machine.

Dealing now specifically with the settlement system 22, the relevant application server machines 30 host one or more settlement applications 42 that enable the transfer of value (e.g., dollar or a proprietary currency) between transacting parties. The settlement applications 42 are further able to read data from and write data to a settlement database 40, via a database server 28. The settlement system 22 may support a payment service, such as the PayPal payment service operated by PayPal, Inc., of Mountain View, Calif.

The micropayment system 24 similarly hosts one or more micropayment applications 38 on application server machines 30, these micropayment applications 38 having read and write access to data stored on a micropayment database 36, via a database server 28. Further details regarding exemplary micropayment applications 38 are described in further detail below.

The trading system 26 hosts one or more trading applications 46 on appropriate application server machines 30, the trading applications 46 having read and write access to data stored on a trade database 44, via a database server 28. The trading applications 46 may include one or more price-setting applications (e.g., an auction application, a fixed-price application, etc.) whereby a value for an agreement between parties may be established. Other trading applications 46 may include, for example, reputation applications that track feedback and transactional history information pertaining to a user. Such reputation applications may also publish reputation information regarding a user, so as to allow users to establish credibility within the trading system 26, and have this reputation information published to potential trading partners, or to other systems (e.g., the settlement system 22 or the micropayment system 24) for use by these systems in assessing the credibility, trustworthiness and the risk factors for a particular user. One example of the trading system 26 is the eBay on-line marketplace, operated by eBay Inc., of San Jose, Calif.

Figure 2:
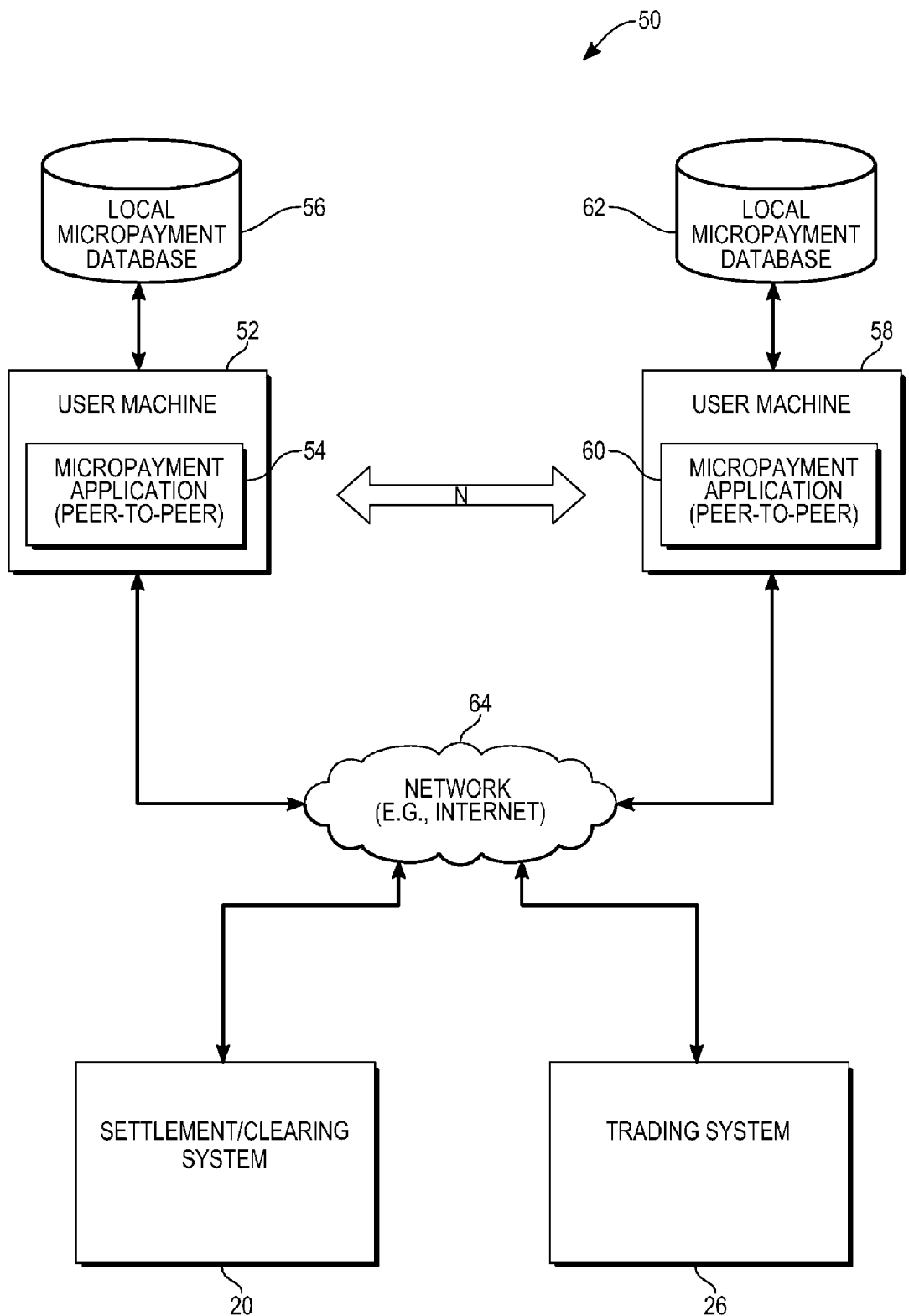
FIG. 2 is a diagrammatic representation of a networked transaction environment, according to an alternative embodiment of the present invention, in which a micropayment system is shown to be deployed as a peer-to-peer system.

FIG. 2 is a diagrammatic representation of a networked transaction environment 50, according to an alternative embodiment of the present invention, in which a micropayment system is shown to be deployed as a peer-to-peer system, as opposed to the server-based system described above with reference to FIG. 1. To this end, FIG. 2 shows the networked transaction environment 50 as including user machines 52 and 58, each of which hosts a respective peer-to-peer micropayment application 54 and 60. Each of the user machines 52 and 58 is shown to be coupled to a network 64 (e.g., the Internet), and the micropayment applications 54 and 60 are accordingly able to communicate via the network 64. Each of the micropayment applications 54 and 60 further has access to a local micropayment database 56 and 62, respectively, and may be architectured and provide the various functions as described in further detail below.

FIG. 2 also illustrates the settlement system 22 and the trading system 26 as being server-based systems with which the relevant micropayment applications 54 and 60 can communicate via the network 64. In a further embodiment of the present invention, the settlement system 22 and/or the trading system 26 may also be deployed utilizing a peer-to-peer architecture, as opposed to the server-based architecture illustrated in FIG. 2. Additionally, have various components of either the settlement system 22 or the trading system 26 may, in alternative embodiments, be deployed as peer-to-peer systems. For example, a peer-to-peer reputation system, or a peer-to-peer risk analysis system, could also be utilized in conjunction with a micropayment system that is server based or is itself a peer to-peer system.

Figure 3:
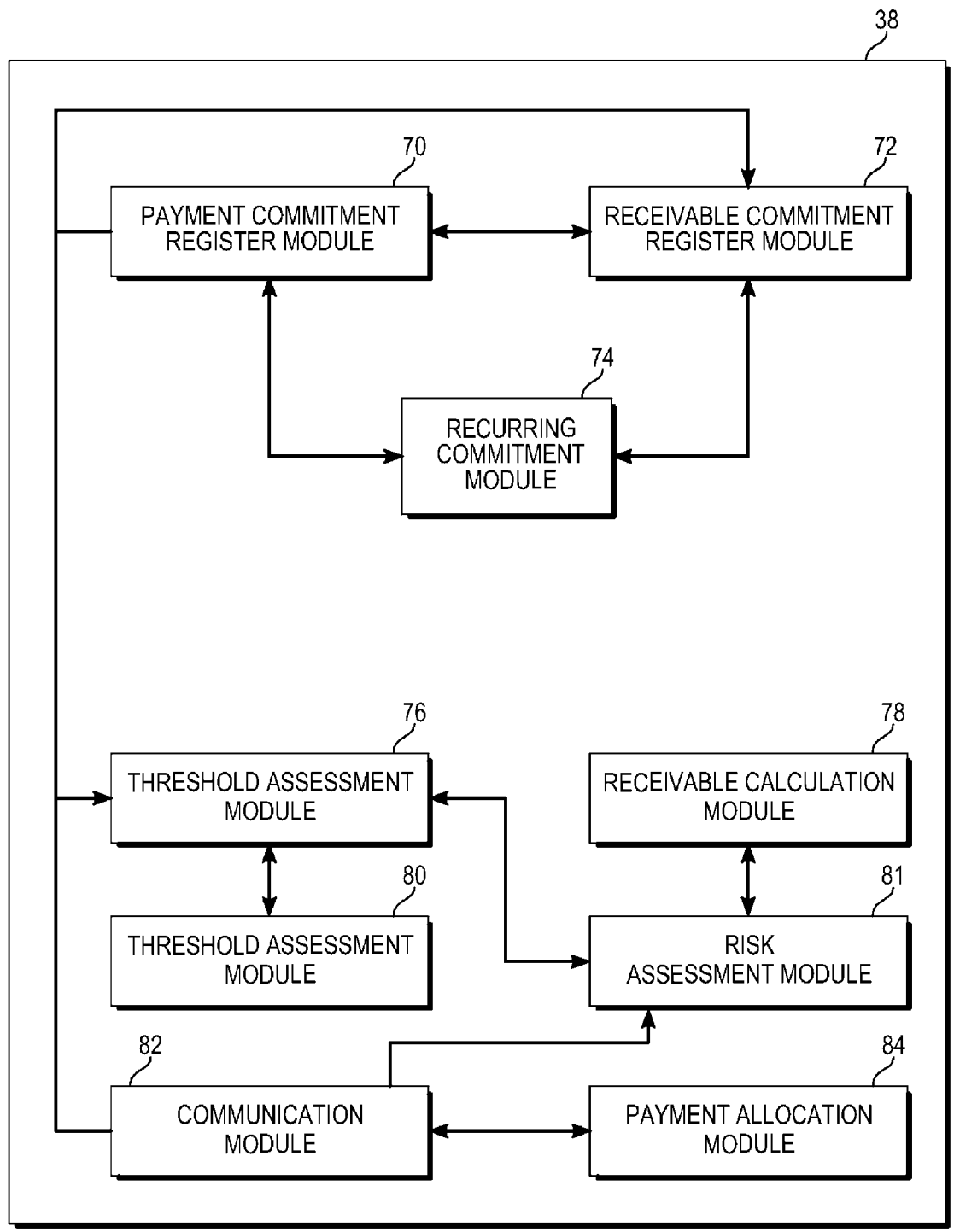
FIG. 3 is a block diagram illustrating further detail regarding micropayment applications, according to one exemplary embodiment of the present invention, which form part of the micropayment system.

FIG. 3 is a block diagram providing further detail regarding the micropayment applications 38, according to one exemplary embodiment of the present invention, that may be hosted on one or more application servers 30 of the micropayment system 24 illustrated in FIG. 1. It will of course be appreciated that the illustrated micropayment applications 38 could also form modules, or sub-applications, of a peer-to-peer, stand-alone micropayment application 54 that executes on a user machine 52.

The exemplary micropayment applications 38 include a payable commitment register module 70, which operates to register payment commitments that may be made by a payor user utilizing the micropayment system 24. For example, the micropayment system 24 may provide one or more user interfaces whereby a payor user can identify a payee user to which the payor user wishes to make a payment commitment, and utilizing which the payor user may also specify a value (e.g., a monetary value) for the relevant payment commitment. One embodiment of the present invention classifies payment commitments as either being unfunded (e.g., the relevant payor user has not made an actual payment to satisfy one or more payment commitments) and funded payment commitments (e.g., the payor user made a payment in satisfaction of one or more payment commitments).

The payment commitment register module 70 may communicate with the web server 32 and/or the API server 34 so as to send commitment information (e.g., to be included within a marked up language document), and to receive payment commitment information from a payor user. The payment commitment register module 70, on receipt of the payment commitment information, further operates to record this information within appropriate tables within the micropayment database 36. Such tables may include, for example, a commitments payable table 94 and a commitments receivable table 96, which are discussed in further detail below with reference to FIG. 4.

Similarly, a receivable commitment register module 72 operates to receive commitment information pertaining to a payment commitment to a payee user, and to register this payment commitment information within an appropriate table, or tables, within the micropayment database 36. For example, the receivable commitment register module 72 may record receivable commitment information within a commitments receivable table 96, which is described in further detail below with reference to FIG. 4.

Both the payable commitment register module 70 and the receivable commitment register module 72 communicate with a recurring commitment module 74. The recurring commitment module 74 is responsible for generating recurring payments commitments as defined by a payor user (for generating or recurring commitment requests as may be defined by a payee user), and for communicating appropriate commitment information to the register modules 70 and 72, responsive to which the register modules 70 and 72 will create and/or update records within the appropriate tables. Consider for example that a particular payor user may wish to make a monthly payment commitment to a specified payee user (e.g., for subscription to a particular service). The recurring commitment module 74 then handles such a recurring commitment.

A threshold adjustment module 76, according to one exemplary embodiment of the present invention, facilitates the specification of, or itself specifies, thresholds that trigger a funding transaction (e.g., the initiation of a payment process) in satisfaction of payment commitments that have been registered within the micropayment system 24. For example, a payable threshold may be specified in connection with payable commitments of a payor user, so that when the total value of payment commitments made by the payor user exceeds the payable threshold, a payment process is initiated whereby the payor user funds the relevant unfunded payment commitments.

Similarly, a receivable threshold may be specified by the threshold adjustment module 76, the receivable threshold being a threshold total value that, when exceeded by the value of payment commitments made to a payee user, renders the payee user eligible to receive value in satisfaction of the payment commitments.

In one embodiment of the present invention, the threshold adjustment module 76 may simply operate to allow an administrator of the micropayment system 24 to specify one or more threshold values (e.g., $5.00) as either a payable threshold or a receivable threshold, for example. For example, an administrator of the micropayment system 24 may specify different thresholds that are applicable to individual payor users or payee users, or even various pairs of payor/payee combinations.

In another embodiment of the present invention, the threshold adjustment module 76 may allow individual users to specify payable and/or receivable thresholds, for example within the constraints of certain minimum and maximum values, which would be applicable to the relevant user.

In yet a further embodiment of the present invention, the threshold adjustment module 76 may automatically calculate payable and/or receivable thresholds, utilizing the various information sources. For example, where the micropayment system 24 is aware that a certain settlement system 22 will be utilized in connection with a particular funding event, the threshold adjustment module 76 may adjust thresholds dependent on transaction charges levied by the relevant settlement system 22. Consider the specific example where a settlement system 22 increases transaction charges associated with funding events. In this case, the threshold adjustment module 76 may raise thresholds so as to maintain the transaction charges as a predetermined maximum percentage of a funding value. In another exemplary embodiment, the threshold adjustment module 76 may adjust thresholds dynamically based on whether a particular payee user has failed to achieve a predetermined rate of payment commitments. For example, the threshold adjustment module 76 may automatically lower a funding receivable threshold so as to prevent the relevant payee user from having to wait an unacceptable amount of time prior to having payment commitments funded. Also, where a payor user is not making payment commitments at a predetermined rate, the threshold adjustment module 76 may also lower the funding payable threshold associated with that user so as to extract funding within an acceptable time period.

The threshold adjustment module 76 may also take into account the characteristic or attribute information associated with a payor or payee user in assessing a threshold associated with that user. For example, where historical or reputation information associated with the user indicates an increased or decreased risk associated with obtaining funding from a payor user, the threshold adjustment module 76 may automatically adjust a funding payable threshold for that user. In yet another exemplary embodiment, the threshold adjustment module 76 may increased or decreased the threshold over time. For example, the threshold may start at a certain level (e.g., $5.00), and be reduced by a predetermined amount each month (e.g., $1.00 per month) to a minimum acceptable transaction value, to ensure that the payor user is eventually made liable to make a funding payment, even if the funding payment is very small.

The threshold adjustment module 76 may also specify thresholds with varying resolutions. For example, the threshold adjustment module 76 may specify thresholds to be applied on a system level across the micropayment system 24. The threshold adjustment module 76 may also specify thresholds to be specified at a user-level, or even at a funding transaction level, depending on various circumstances.

FIG. 3 shows the threshold adjustment module 76 being coupled to a threshold assessment module 80, the threshold assessment module 80 operating to assess whether a commitment payable total, for a commitment receivable total, exceeds a specified threshold. Operation of the threshold assessment module 80 is described in further detail below with reference to FIG. 6.

The micropayments applications 38 are, in one exemplary embodiment, also shown to include a receivable calculation module 78 that operates to calculate a total commitment receivable value for a payee user, utilizing a risk profile associated with a user (e.g., the payee user). In other embodiments of the present invention, the calculation of the total commitment receivable value may take other risk information into account. The invention is accordingly not limited to the utilization of a risk profile associated with a user, but may include the utilization of any information from which a risk determined or inferred.

The receivable calculation module 78 is shown to communicate with a risk assessment module 81, which determines the risk profile associated with a user (e.g., the payee user). For example, the risk assessment module 81 may author a risk profile for a user (or otherwise calculate a risk value for utilization within the micropayments system 24) utilizing historical and reputation information. The historical and/or reputation information utilized by the risk assessment module 81 may be obtained locally from the micropayment system 24, or may be obtained from other sources, such as for example reputation information obtained from the trading system 26, and historical payment information obtained from the settlement system 22. The risk assessment module 81 may also obtain information from third party information vendors, such as Equifax and credit score organizations.

A wide variety of other information sources may be utilized by the risk assessment module 81 in calculating risk values (e.g., a risk profile for a user) for utilization within the micropayment system 24. For example, a type of merchandise or service offered by a particular user may be relevant. For example, gaming or pornography services are typically at a higher risk of default by payor users. A geographic location of a payor or a payee user may also be relevant. It should be noted any combination of information associated with any type of user, or any party to a particular transaction, may be utilized by the risk assessment module 81 in assessing risk. The assessment risk may furthermore be utilized beyond the calculation of the total commitment receivable value for a payee user, and may be utilized for risk-adjusting other payment values and other purposes within the micropayment system 24, for example as described below.

The risk assessment module 81 is also shown to provide input to the threshold adjustment module 76, so as to enable the module 76 to utilize a risk profile in adjusting threshold values associated with the user, if warranted.

The micropayment applications 38 also include a communication module 82 to enable the communication of various types of information between the micropayment applications 38 and other applications (e.g., the settlement application 42 and the trading applications 46 illustrated in FIG. 1), as well as the communication of messages (e.g., emails, SMS messages, Instant Messages (IMs), etc.) to users of the micropayment system 24. For example, the communication module 82 may communicate instructions to settlement applications 42, as part of a payment process, to initiate the transfer of funds from a payor user to a payee user. The communication of such instructions may be performed automatically on instruction from a payment allocation module 84, or may be performed upon receiving instructions from a user for the relevant funds transfer.

The communication module 82 may also receive communications from other applications. For example, the settlement applications 42 may communicate back to the communication module 82 that funds have successfully been transferred from a payor user to a payee user, responsive to which the micropayment applications 38 may register certain commitments as being funded. To this end, the communication module 82 is shown to be in communication with the register module 70 and 72, so as to enable these modules to register commitments as funded, when appropriate and as confirmed by a settlement application 42.

The communication module 82 is also shown to be in communication with the threshold adjustment module 76 so as to enable the threshold adjustment module 76 and the risk assessment module 81 to send communications to, and receive communications from, external systems such as the settlement system 22 and the trading system 26.

A payment allocation module 84 operates, in one exemplary embodiment of the present invention, to instruct the automatic transfer of funds from a payor user to a payee user. For example, a payor user may have defined preferences in terms of which payment commitments are automatically funded upon the total of such commitments exceeding a funding payable threshold. Further, the payor user may have specified preferences as to which payee user is to receive the relevant funds, or have specified criteria in terms of which the payment allocation module 84 may automatically identify a payee user to which the funds should be allocated. For example, a specific user may define preferences whereby, upon the total of payment commitments for the payor user exceeding a threshold, such commitments are funded by making a payment to a charity organization that qualifies to receive the funding.

As will be described in further detail below, in one exemplary embodiment, receivable commitments, when exceeding a funding receivable threshold, may be placed in a funding queue by the receivable calculation module 78 and by the threshold assessment module 80. In this embodiment, the payment allocation module 84 may operate various algorithms to determine which of the eligible payees within the funding queue is to be funded next, or upon occurrence of a specific event. For example, the payment allocation module 84 may allocate funding to the funding queue based on a simple first in, first out principle. Alternatively, the payment allocation module 84 may apply more sophisticated criteria to the selection of payees from within the funding queue.

Figures 4, 5:
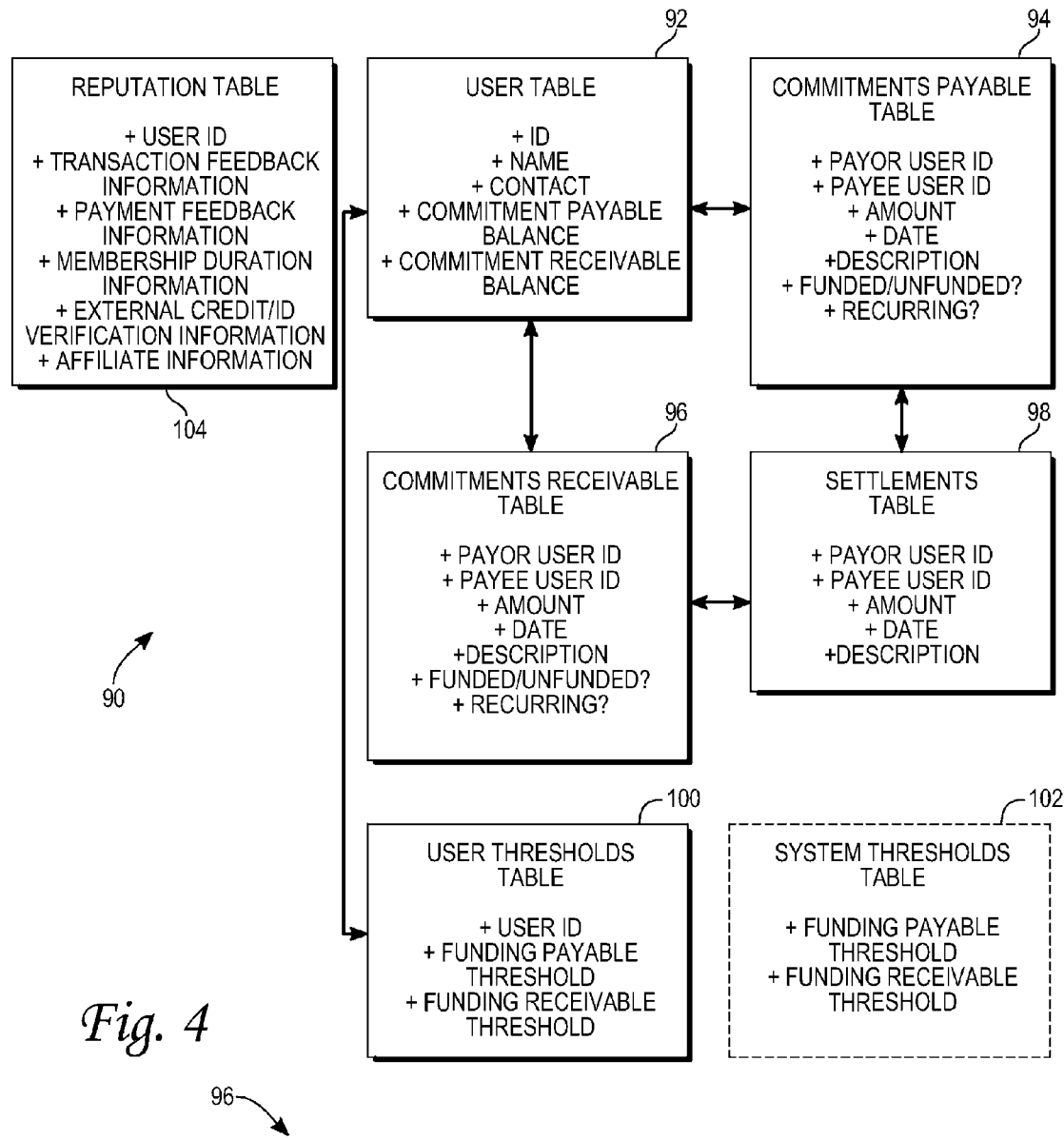
FIG. 4 is a high-level entity-relationship diagram illustrating various tables, according to one exemplary embodiment of the present invention, which may reside within a micropayment database associated with the micropayment system.
FIG. 5 is a block diagram illustrating an exemplary commitments receivable table that is populated with values.

FIG. 4 is a high-level entity-relationship diagram illustrating various tables 90, according to one exemplary embodiment of the present invention, which may reside within the micropayment database 36. The tables 90 include a user table 92 in which is stored contact and other information specific to each user. A commitments payable table 94 maintains a record of each payment commitment made to a specific user, and includes identifiers identifying the payor user, the payee user, an amount of the commitment, the date on which the commitment was made, a description of the commitment, an indication of whether the commitment is funded or not, and an indication as to whether the commitment is recurring.

Similarly, a commitments receivable table 96 stores records for each payment commitment receivable by a particular user, and records the same information recorded within the commitments payable table 94.

It will be appreciated that by maintaining separate commitments payable and commitments receivable tables 94 and 96, these tables may be utilized to perform double-entry verification. In an alternative embodiment, the commitments payable table 94 and the commitments receivable table 96 may be combined into a single commitments table.

A settlements table 98 is populated with records for each funding transaction between a particular payor user and a particular payee user. The records within the settlement table 98 may be generated from information retrieved from the settlement system 22, and may also be utilized by the register modules 70 and 72 to flag entries within the tables 94 and 96 as funded responsive to a particular funding transaction.

The tables 90 further includes a user thresholds table 100, which stores a funding payable threshold and a funding receivable threshold for each user for which a record exists within the user table 92. As described above, in one exemplary embodiment of the present invention, payable and receivable thresholds may be specified at a user-level. In an alternative embodiment of the present invention, a system thresholds table 102 may store funding payable and funding receivable thresholds that are applicable at a system level within the micropayment system 24. Of course, both user thresholds and systems thresholds table 100 and 102 may exist, and the recorded thresholds may be selectively applied by the payment allocation module 84, depending on predetermined criteria.

The tables 90 also include a reputation table 104 that is populated with records that include feedback and history information for a particular user. For example, the reputation table 104 may include transaction feedback information, payment feedback information, membership duration information, external credit or identification verification information, and affiliate information. As described above, information within the reputation table 104 may be internally generated within the micropayment system 24, or may be received via the communication module 82 from external sources and systems (e.g., the settlement system 22 and the trading system 26).

FIG. 5 is a block diagram illustrating an exemplary commitments receivable table 96 that is populated with values. As shown, various commitments are flagged as either being funded or unfunded, depending on whether a relevant payor has performed a funding transaction that applies and covers the relevant payment commitment.

It should be noted that the user table 92 might, in one exemplary embodiment, reflect a commitment payable balance and a commitment receivable balance. The receivable calculation module 78, based on information contained within the commitments payment table 94 and the commitments receivable table 96, may periodically update these balances.

Figure 6:
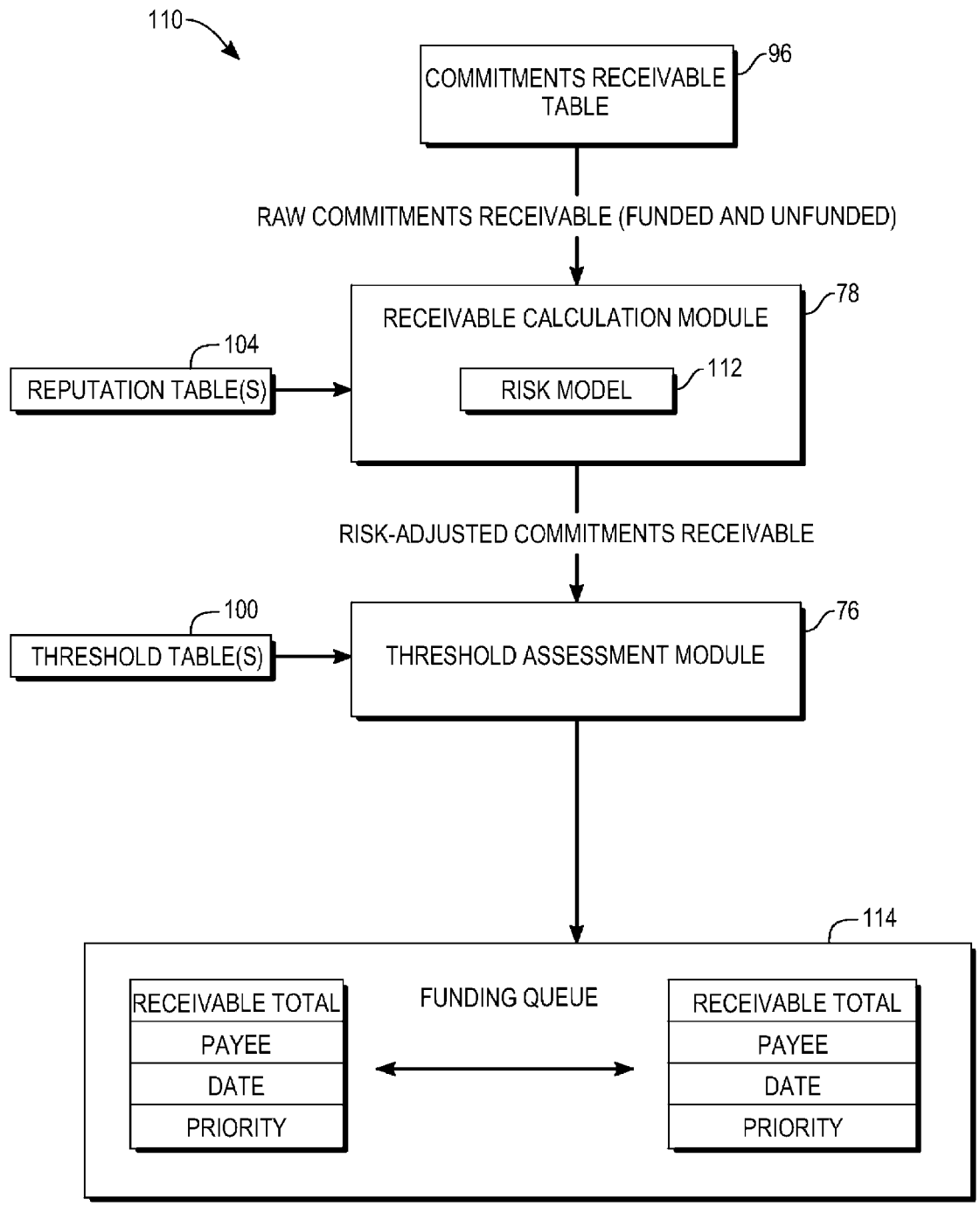
FIG. 6 is a flowchart of a method, according to an exemplary embodiment of the present invention, whereby micropayment applications may calculate a total commitment receivable value, owed to a payee user, and then allocate that total commitment receivable value to a funding queue.

FIG. 6 is a flowchart of a method 110, according to an exemplary embodiment of the present invention, whereby the micropayment applications 38 may calculate a total commitment receivable value, owed to a payee user, and then allocate that total commitment receivable value to a funding queue. Specifically, the commitments receivable table 96 provides input, in the form of raw commitments receivable information, to the receivable calculation module 78. The receivable calculation module 78 deploys a risk model 112 to calculate a risk-adjusted commitments receivable value total. The risk model 112 utilizes information retrieved from the reputation table 104 to author a risk profile, associated with the relevant payee user, and calculates the risk-adjusted commitments receivable total as a function of the authored risk profile. In one embodiment, the risk profile is applied only to the unfunded portion of the raw commitments receivable total, in view of the uncertainty regarding the funding of this portion of the commitments receivable total. In other embodiments of the present invention, the risk profile that is applied to the unfunded portion of the raw commitments receivable total is not particularly associated with the payee user, but may be applicable across the micropayment system 24 as a whole, or may be calculated based on the payor users associated with the unfunded payment commitments.

The function of the risk profile that is applied by the receivable calculation module 78 may be a simple function (e.g., a simple percentage calculation), or may be a more complex function that takes a number of factors into consideration. For example, the risk profile (or other at risk value) may be calculated utilizing any of the information types specified above. Further, the function of the risk profile (or risk value) that is applied by the receivable calculation module 78 may be the subject of continuous improvement or adjustment, either by an administrator of the micropayment system 24 or by its own machine learning.

The risk-adjusted commitments receivable total is then communicated from the receivable calculation module 78 to the threshold assessment module 80, which makes a determination as to whether the risk-adjusted commitments receivable total exceeds a threshold that qualified the receivable total for funding. In making this assessment, the threshold assessment module 80 may utilize information contained in the threshold tables 100 or 102, described above with reference to FIG. 4. As noted, the thresholds may be applied on a system-level, a user-level or a transaction-level.

In the even that the threshold assessment module 80 determines that the risk-adjusted commitments receivable total is qualified to receive funding, the relevant receivable total is entered into a funding queue 114. Each entry within the funding queue 114 records the risk-adjusted commitments receivable total, the payee user, the date on which the receivable total was entered into the funding queue, and a priority. In one embodiment, the payment allocation module 84 may determine the priority. Specifically, the payment allocation module 84 may prioritize each of the entries within the funding queue 114 based on a first in, first out priority scheme, or a more complex priority scheme. For example, entries for which the payee is a specific type of organization (e.g., a charity), or is identified as a priority payee, may be prioritized ahead of other entries. In other embodiments, the priority scheme may be utilized to prioritize entries within the funding queue to ensure that the payees do not wait an unacceptable period of time prior to receiving funding.

Figure 7:
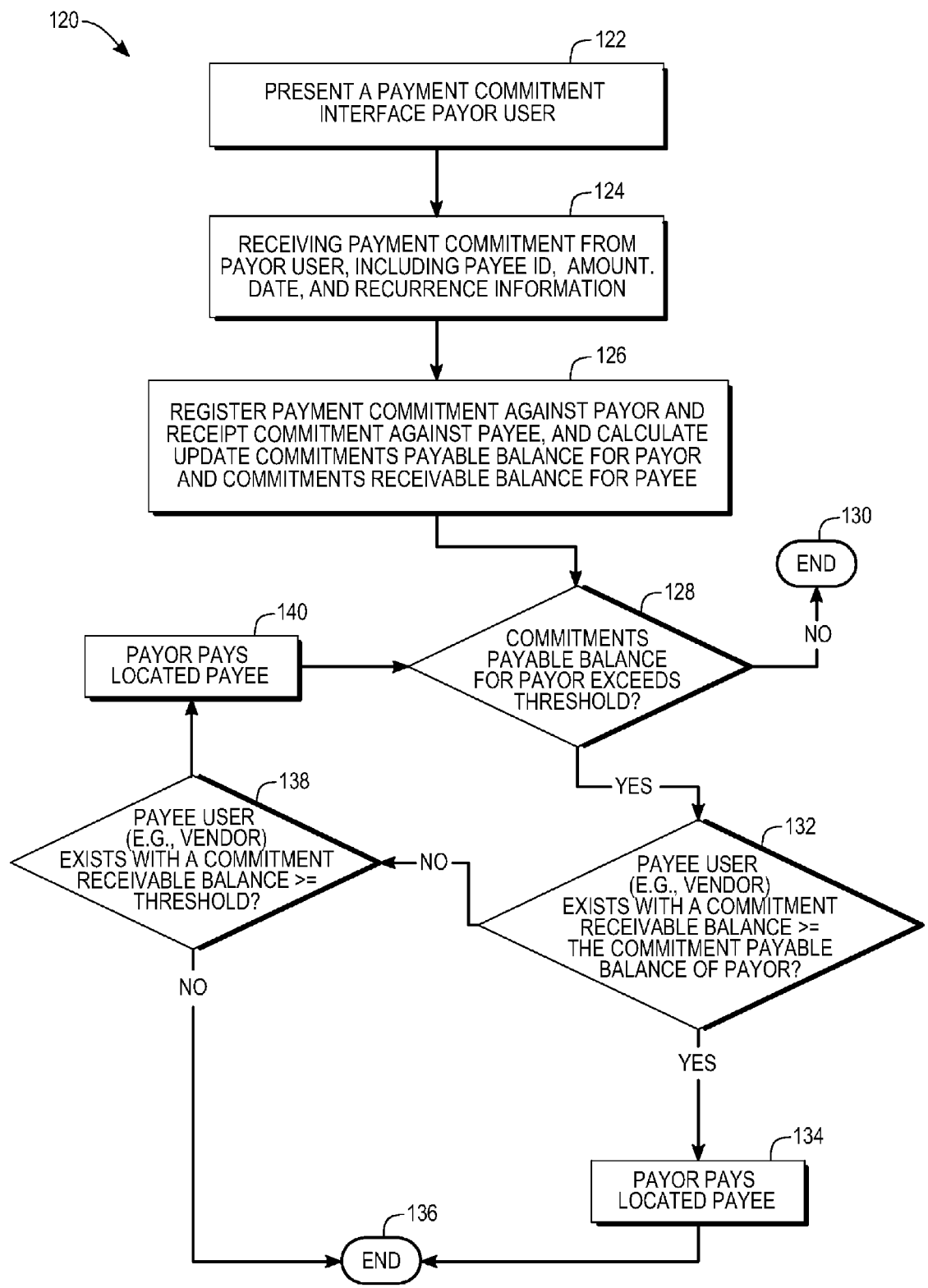
FIG. 7 is flowchart illustrating a method, according to an exemplary embodiment of the present invention, to facilitate payments between parties for aggregated payment commitments.
Figure 9:
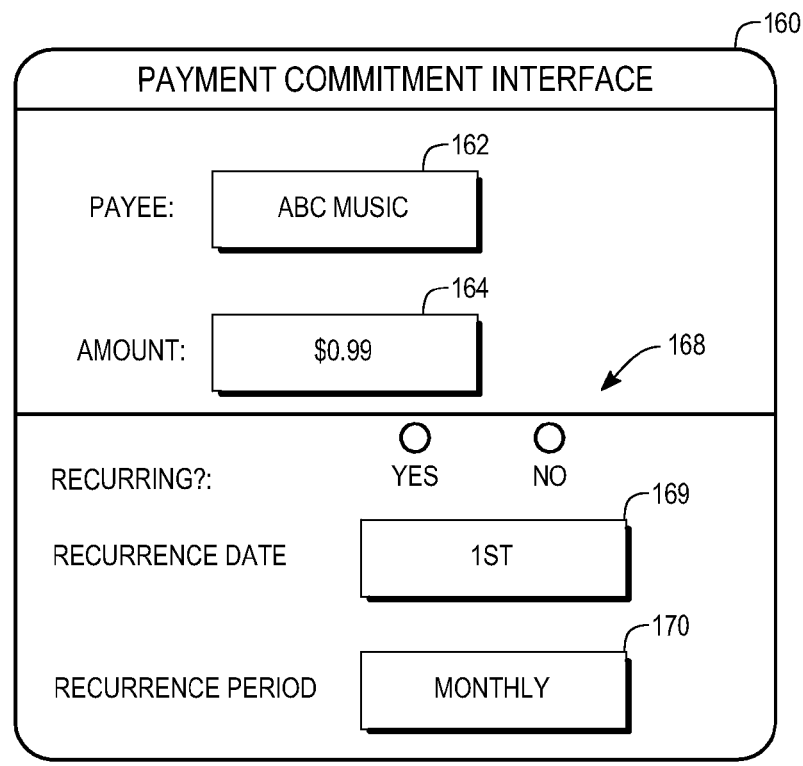
FIG. 9 illustrates an exemplary payment commitment interface that may be generated and presented by the micropayment system.

FIG. 7 is flowchart illustrating a method 120, according to an exemplary embodiment of the present invention, to facilitate payments between parties for aggregated payments commitments. The method 120 commences at block 122, with the presentation of the payment commitment interface to a payor user. FIG. 9 illustrates an exemplary payment commitment interface 160, which may be presented at block 122. As will be noted from FIG. 9, the payment commitment interface 160 may include a payee identification field 162, within which a payor user may identify a payee user, and an amount field 164, into which a payor user can input a value associated for the relevant commitment. The payment commitment interface 160 also includes a recurrence section 168, which allows the payor user to identify the commitment as being recurring (e.g., using yes/no radio buttons), and allows the payor user to specify a recurrence date within a recurrent date field 169, and the recurrence period within a recurrence period field 170. In other exemplary embodiments, the interface 160 may provide other mechanisms for indicating recurrence, such as number and frequency of payment, e.g, "make 25 commitments of $0.10 each, one commitment per day."

Returning to FIG. 7, at block 124, the communication module 82 receives payment commitment information from the payor user (e.g., via the web server 32 or the API server 34), the payment commitment information including an identifier for the payee user, an amount, a date and the above discussed recurrence information.

At block 162, the payment commitment register module 70 registers a payment commitment, based on the payment commitment information, against the payor user within the commitments payable table 94. Similarly, the receivable commitment register module 72 registers the payment commitment against the payee user in the commitments receivable table 96. Further, the receivable calculation module 78 may calculate and update the commitments payable and commitments receivable balances for each of the payor and the payee users within the user table 92, based on the received payment commitment information.

At decision block 128, as are described above, the updated commitments receivable balance that is calculated at block 126 and reflected in the user table 92, may be a risk-adjusted commitments receivable balance (or total) as calculated by the receivable calculation module 78.

Moving on to decision block 128, the threshold assessment module 80, subsequent to the updating of the commitments payable balance, determines whether the commitments payable balance for the payor exceeds a pre-determined threshold funding payable threshold (e.g., specific at a user-level or a system-level threshold). In the event that the commitments payable balance for the payor user does not exceed a threshold, the method 120 then terminates at block 130.

On the other hand, should the commitments payable balance for the payor user exceed the funding payable threshold, at decision block 132, the payment allocation module 84 makes a determination whether a payee user (e.g., a vendor) exists with a commitments receivable balance that is equal to, or exceeds, the commitments payable balance of the payor user. As noted above, the commitments receivable balance is, in an exemplary embodiment, a risk-adjusted commitments receivable balance. The determination performed by the payment allocation module 84 at decision block 132 may include the payment allocation module 84 performing a search of the funding queue 114 to identify entries having a commitments receivable total that is satisfiable by the commitments payable balance of the payor user. In performing the search of the funding queue 114, the payment allocation module 84 may also consider the priority data associated with each entry when attempting to identify an eligible payee user.

In the event that the payment allocation module 84 is successful in identifying a payee user at decision block 132, the method 120 proceeds to block 134, where a payment process is initiated to effect a funding payment from the payor user to the located payee user.

Figure 10:
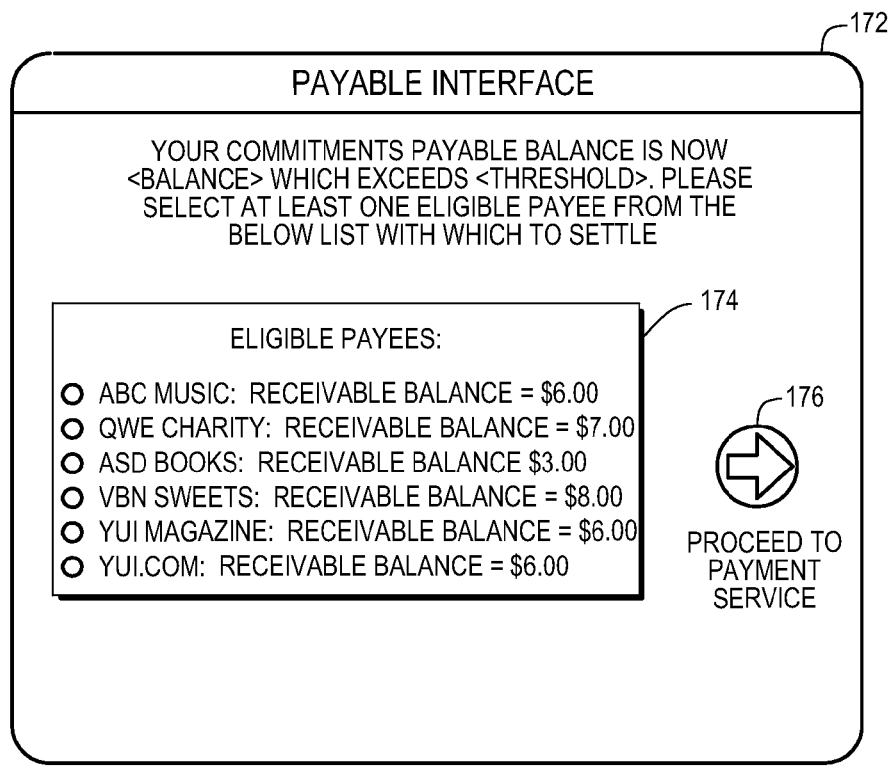
FIG. 10 illustrates an exemplary payable interface that may be generated and presented by the micropayment system.

In various embodiments of the present invention, the initiation of the payment process at block 134 may take various forms. For example, the micropayment system 24, may at block 134 present a payable interface 172, an exemplary embodiment of which is illustrated in FIG. 10, to the payor user, the payable interface 172 communicating to the payor user that (1) his or her commitments payable balance exceeds the threshold, and that (2) the payor user is now required to make a funding payment to the located payee user. In one exemplary embodiment of the present invention, the payment allocation module 34 may, at decision block 132, in fact identify a number of payee users that are eligible to receive the funding payment. In this exemplary embodiment, the payable interface 172 may present to the payor user a list 174 of eligible payee users, together with a mechanism (e.g., a radio box) to select at least one of the eligible payee users to receive the funding payment.

The payable interface 172 also shown in FIG. 10 to include a "proceed to payment service" button 176, which is user-selectable to divert the payor user to the settlement system 22. The settlement system conveniently allows the payor user to make the funding payment to the selected payee user. Accordingly, selection of the button 176 may cause the micropayment system 24, utilizing the communication module 82, to communicate payor user identification information, payee user identification information, amount information and funding amount information to the settlement system 22. Where the settlement system 22 is web-services enabled, this information may be received via a relevant API server 34. The settlement applications 42 of the settlement system 22 may then initiate a flow whereby the funding transaction payment may be completed.

In an alternative embodiment of the present invention, at block 134, the payment allocation module 84 may automatically communicate instruction that cause the funding payment to be paid to the payee user, without manual intervention or approval by the payor user. For example, the payment allocation module 84, utilizing the communication module 82, may communicate instructions to the settlement system 22 to perform the funding payment into an account of the payee user.

Where the settlement system 22 is utilized to complete the payment at block 134, the settlement system 22 may communicate confirmation information back to the micropayment system 24, this information being received by the communication module 82, and then provided to the register modules 70 and 72. Responsive to receiving confirmation of the funding payment, the register modules 70 and 72 may then flag the payment commitments within the commitments tables 94 and 96 as being funded.

Moving on from block 134 of the method 120, the method 120 then terminates at block 136.

Returning to decision block 132, in the event that the payment allocation module 84 is unable to locate a payee user within the funding queue 114 with a commitments receivable value that is greater than or equal to the commitments payable balance, the payment allocation module 84 proceeds to attempt to locate a payee user with a commitments receivable balance that is greater than or equal to a predetermined threshold. In the exemplary embodiment of the present invention that includes the funding queue 114, the threshold assessment module 80 will have already identified, and placed within the funding queue 114, all commitments receivable balances that exceed an appropriate funding payable threshold. In this case, the payment allocation module 84 selects a next commitments receivable balance, from the funding queue 114 and according to the employed priority scheme, to receive the funding payment. In an alternative embodiment to the present invention, the threshold assessment module 80, at decision block 178, performs an analysis on the commitments receivable balances (e.g., risk-adjusted or otherwise) with a view to identifying eligible payee users, where after the payment allocation module 84 may dynamically select from the eligible payee users.

In the event that the payment allocation module 84 is unable to locate an eligible payee user at block 138 (e.g., the funding queue 114 is empty), the method 120 proceeds to block 136 and ends. On the other hand, if at least one eligible payee user is identified, the method 120 progresses to block 140, and a process whereby the payor user pays the payee user the funding payment is initiated. The method 120 then loops back from block 140 to decision block 128.

Figure 8:
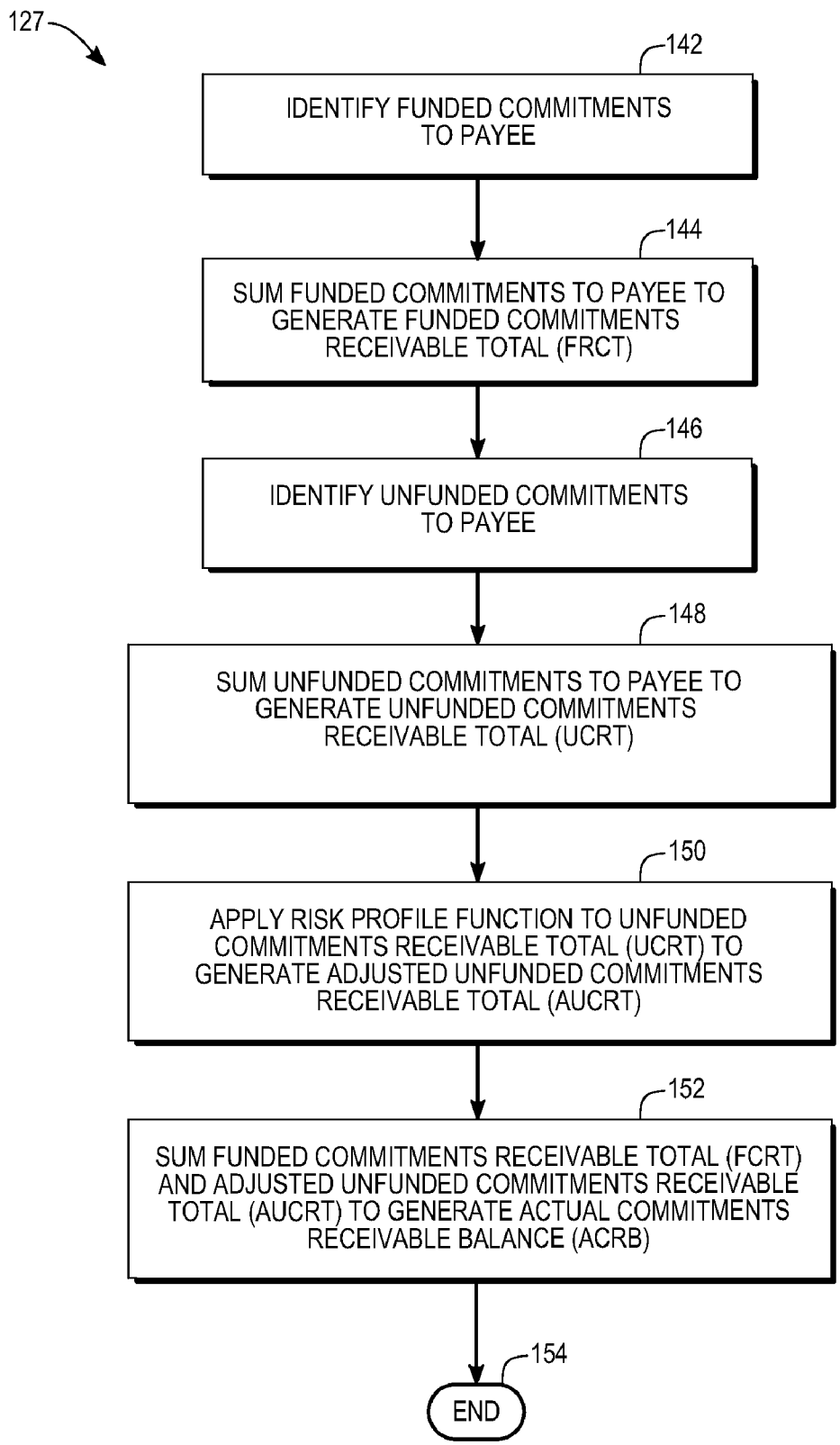
FIG. 8 is a flowchart illustration of an exemplary method to calculate a risk-adjusted commitments receivable balance for a particular payee user.

FIG. 8 is a flowchart illustration of an exemplary method 127, which may be performed within the context of the block 126 of FIG. 7. The method 127 is to calculate a risk-adjusted commitments receivable balance for a particular payee user. The receivable calculation module 78 may perform the method 127.

The method commences at block 142 with the identification of the funded commitments to the payee by performing a search of the commitments payable table 94.

At block 144, the module 78 sums identified funded commitments to the payee user, to thereby generate a funded commitments receivable total.

At block 146, the module 78 identifies unfunded payment commitments to the payee, again by performing a search of the commitments payable table 94.

At block 148, the module 78 sums the unfounded payment commitments to the relevant payee user to generate an unfunded commitments receivable total.

Moving on to block 150, utilizing the risk model 112, the receivable calculation module 78 applies a risk profile function to the unfunded commitments receivable total, thereby to generate a risk-adjusted unfunded commitments receivable total.

At block 152, the receivable calculation module 78 then sums the funded commitments receivable total, and the risk-adjusted funded commitments receivable total, to generate the risk-adjusted commitments receivable value total, which may then be written into the user table 92, or otherwise stored within the micropayment system 24. The method 127 then ends at block 154.

While the risk adjustment is described above as being performed with respect to unfunded commitments to a payee user, the present invention is not so limited. In alternative embodiments of the present invention, the risk adjustment may be performed with respect to an entire commitments receivable total, and need not be performed only on the unfunded component thereof.

Figure 11:
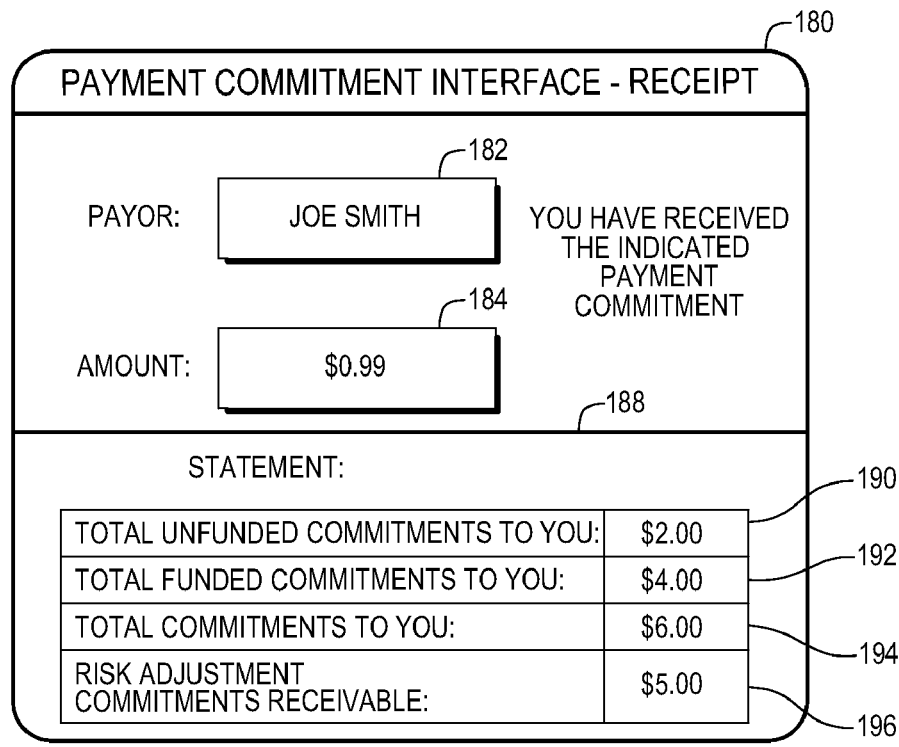
FIG. 11 illustrates an exemplary payment commitment receipt interface that may be presented to a user of the micropayment system via a respective web server.

FIG. 11 illustrates an exemplary payment commitment receipt interface 180 that may be presented to a user of the micropayment system 24 via a respective web server 32. Specifically, the interface 180 may be presented to a payee user in order to advise the payee user of receipt of a payment commitment from a payor user. To this end, the interface 180 may identify the payor user to the payee user via a payor field 182, and may also communicate the amount of the payment commitment within an amount field 184.

The interface 180 is also shown to include a statement portion 188, which communicates to the payee user a total of unfunded commitments receivable 190, a total funded commitments receivable 192, a total commitments receivable 194 and a risk-adjusted commitments receivable total 196, calculated in the manner described above.

Figure 12:
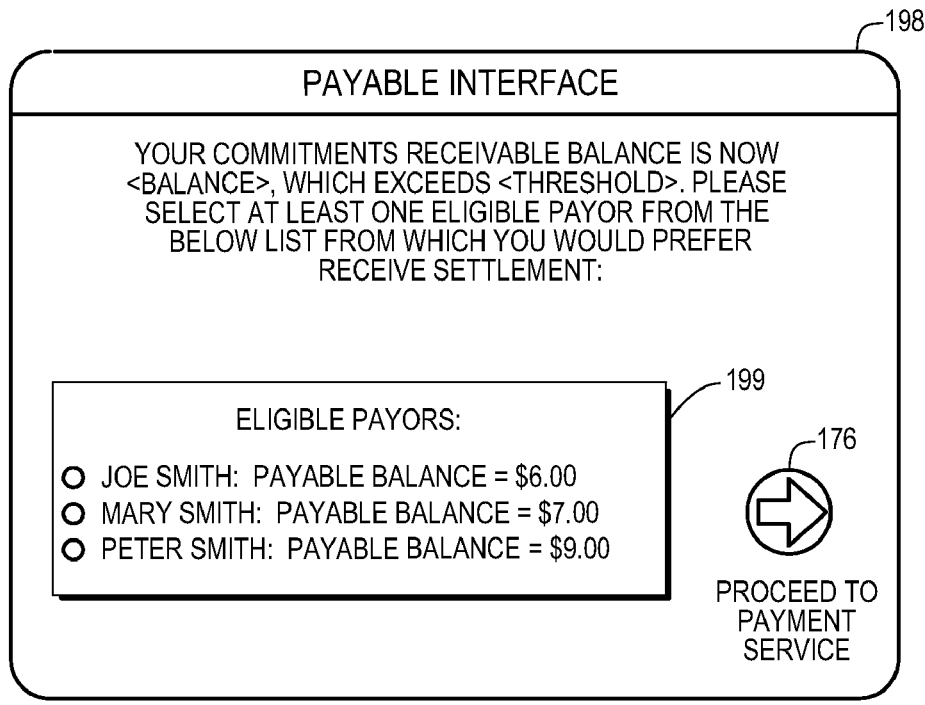
FIG. 12 illustrates an exemplary payable interface, which may be presented to a payee user, advising the payee user that a commitments receivable balance exceeds a threshold that is eligible for a funding payment.

In one embodiment of the present invention, the micropayment system 24 may also allow a payee user to select from a list of eligible payor users from which the payee user would prefer to receive a funding payment. To this end, FIG. 12 illustrates an exemplary payable interface 198, which may be presented to a payee user, advising the payee user that a commitments receivable balance exceeds a threshold that is eligible for a funding payment, and also presenting a list 199 of eligible payors, together with amounts that the eligible payors are eligible to pay. The payable interface 198 also includes a "proceed to payment service" button 176 that, in the manner described above, may initiate an interaction between the micropayment system 24 and the settlement system 22.

Figure 13:
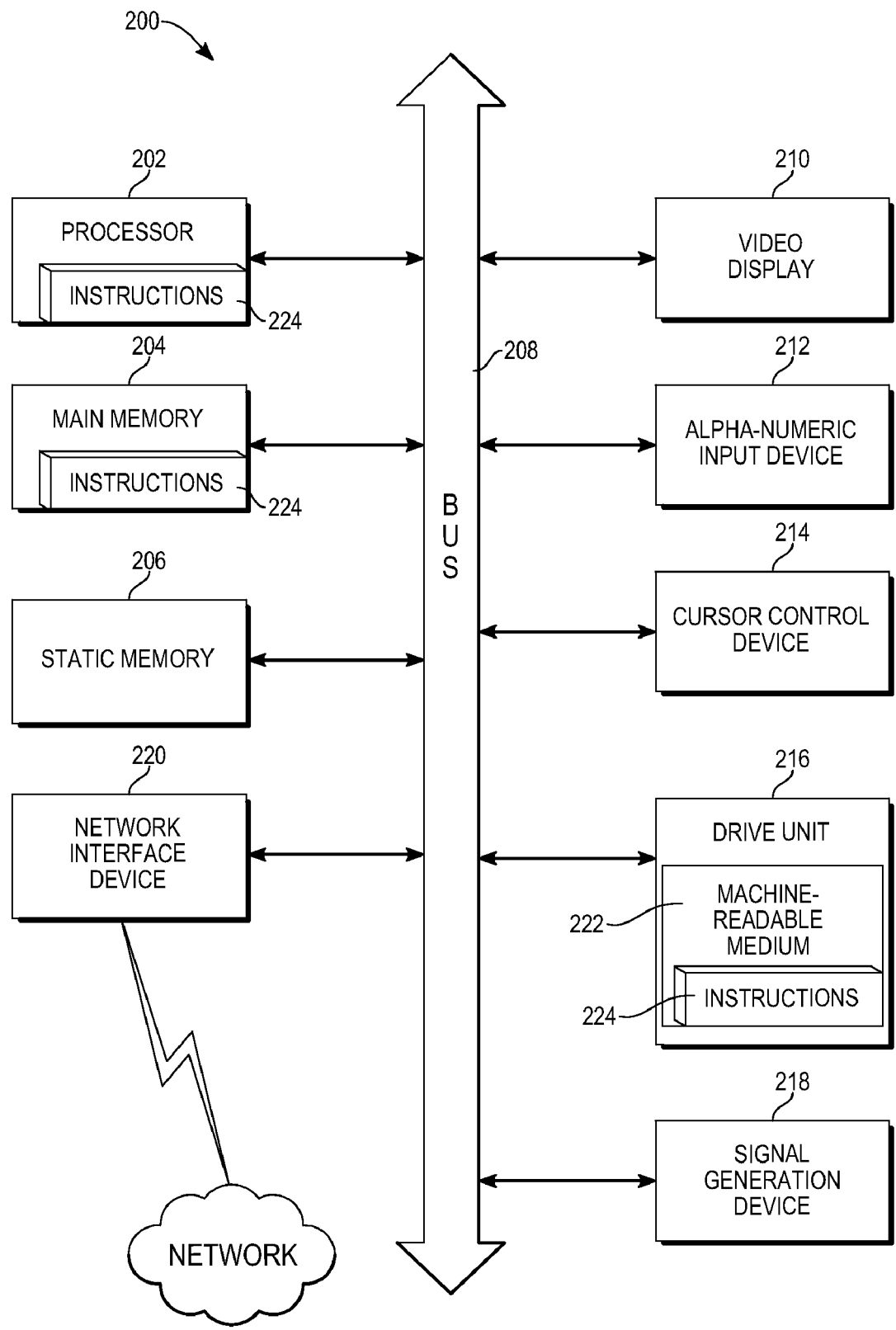
FIG. 13 shows a diagrammatic representation of machine in the exemplary form of a computer system within which a set of instructions, for causing the machine to perform any one or more of the methodologies discussed herein, may be executed.

FIG. 13 shows a diagrammatic representation of machine in the exemplary form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 292 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method and system to enable the transfer of micropayments to a vendor have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   accessing a plurality of payment commitments made to a second party, the plurality of payment commitments contributing towards a total commitment receivable value of the second party and made by a plurality of payor parties to the second party;
   calculating, using at least one processor, the total commitment receivable value of the second party based on the plurality of payment commitments made to the second party utilizing a risk indication, the risk indication being based on reputation information associated with at least one of a first party or the second party; and
   initiating a payment process based on the total commitment receivable value, the payment process involving a transfer of the total commitment receivable value from the first party to the second party.

2. The method of claim 1, further comprising registering the plurality of payment commitments made to the second party.

3. The method claim 1, further comprising retrieving the risk indication from a database.

4. The method of claim 1, wherein the payment process is initiated when the total commitment receivable value of the second party is satisfiable by a total commitment payable value of the first party, the total commitment payable value of the first party based a plurality of payment commitments made by the first party.

5. The method of claim 1, wherein the plurality of payor parties comprises the first party.

6. The method of claim 1, wherein the risk indication comprises a risk profile associated with at least one of the first and the second party and wherein the risk profile is determined utilizing at least one risk indicator.

7. The method of claim 6, wherein the at least one risk indicator comprises a transaction history, a payment history, a transaction feedback, or a payment feedback.

8. The method of claim 1, wherein the plurality of payment commitments made to the second party is made over a period of time, and the total commitment payable value is modified over the period of time to reflect each payment commitment of the plurality of payment commitments.

9. The method of claim 1, further comprising:
   identifying that the total commitment receivable value exceeds a funding receivable threshold; and
   allocating the total commitment receivable value for the second party to a funding queue.

10. The method of claim 1, further comprising determining that the total commitment payable value exceeds a funding payable threshold.

11. The method of claim 1, wherein the initiation of the payment process includes providing an instruction to the first party to make a payment of the total commitment receivable value to the second party.

12. A system comprising:
   a micropayment database to store a plurality of payment commitments made to a second party, the plurality of payment commitments contributing towards a total commitment receivable value of the second party and made by a plurality of payor parties to the second party;
   a calculation module to calculate, using at least one processor, the total commitment receivable value of the second party based on the plurality of payment commitments made to the second party utilizing a risk indication, the risk indication being based on reputation information associated with at least one of a first party or the second party; and
   a payment application module to initiate a payment process based on the total commitment receivable value, the payment process involving a transfer of the total commitment receivable value from the first party to the second party.

13. The system of claim 12, further comprising a register module to register the plurality of payment commitments made to the second party.

14. The system of claim 12, wherein the payment application module is to identify the total commitment receivable value of the second party as being satisfiable by a total commitment payable value of the first party, the total commitment payable value of the first party based on a plurality of payment commitments made by the first party.

15. The system of claim 12, wherein the plurality of payor parties comprises the first party.

16. The system of claim 12, wherein the risk indication comprises a risk profile associated with at least one of the first and the second party and wherein the risk profile is determined utilizing at least one risk indicator, the at least one risk indicator comprising a transaction history, a payment history, a transaction feedback, or a payment feedback.

17. The system of claim 12, wherein the payment application module is to:
   determine that the total commitment receivable value exceeds a funding receivable threshold; and
   allocate the total commitment receivable value for the second party to a funding queue.

18. The system of claim 12, wherein the payment application module is to initiate the payment process when the total commitment payable value exceeds a funding payable threshold.

19. A non-transitory computer-readable storage medium in communication with at least one processor, the computer-readable storage medium storing instructions which, when executed by the at least one processor, provides a method, the method comprising:
   accessing a plurality of payment commitments made to a second party, the plurality of payment commitments contributing towards a total commitment receivable value of the second party and made by a plurality of payor parties to the second party;
   calculating the total commitment receivable value of the second party based on the plurality of payment commitments made to the second party utilizing a risk indication, the risk indication being based on reputation information associated with at least one of a first party or the second party; and
   initiating a payment process based on the total commitment receivable value, the payment process involving a transfer of the total commitment receivable value from the first party to the second party.

20. The computer-readable medium of claim 19, wherein the method further comprises identifying the total commitment receivable value of the second party as being satisfiable by a total commitment payable value of the first party, the total commitment payable value of the first party based on a plurality of payment commitments made by the first party.

* * * * *

UNITED STATES PATENT AND TRADEMARK OFFICE
CERTIFICATE OF CORRECTION

PATENT NO. : 8,051,007 B2
APPLICATION NO. : 12/544919
DATED : November 1, 2011
INVENTOR(S) : Pierre M. Omidyar It is certified that error appears in the above-identified patent and that said Letters Patent is hereby corrected as shown below:

Title Page, below "field (63)" insert
-- (30)    Foreign Application Priority Data
    PCT/US03/35950    Nov. 10, 2003 --.

On page 3, under "Other Publications", item (56), in column 1, line 1, delete "Developming" and insert -- Developing --, therefor.

In column 11, line 9, delete "even" and insert -- event --, therefor.

In column 11, line 46, delete "e.g," and insert -- e.g., --, therefor.

In column 16, line 4, in Claim 3, after "method" insert -- of --.

In column 16, line 10, in Claim 4, after "based" insert -- on --.

Signed and Sealed this
Twentieth Day of March, 2012

David J. Kappos
*Director of the United States Patent and Trademark Office*